United States Patent [19]

Yarmashev et al.

[11] Patent Number: 4,901,511
[45] Date of Patent: Feb. 20, 1990

[54] HARVESTER REEL RAKE BAR

[76] Inventors: Jury N. Yarmashev, Taganrog, I Krepostnoi Pereulok, 34, kv. 213, Rostovskaya oblast; Alexandr I. Nikolaenko, Taganrog, Bezymyanny proezd, 5/I, kv. 40, Rostovskaya oblast; Alexandr F. Kotenko, Taganrog, Bezymyanny proezd, 3, kv. 8, Rostovskaya oblast; Evgeny A. Chernenko, Taganrog, Bezymyanny proezd, 3, kv. 37, Rostovskaya oblast; Vsevolod V. Abramov, ulitsa Poklonnaya, 6, kv. 4; Alexandr V. Veselov, ulitsa Karla Marxa, 21/4, kv. 20, both of Moscow; Nikolai I. Rysin, Solntsevsky prospekt, 6, korpus I, kv. 27, Moscow; Vera N. Salnikova, ulitsa Studencheskaya, 16, kv. 88, Moscow, all of U.S.S.R.

[21] Appl. No.: 257,429

[22] Filed: Oct. 13, 1988

[51] Int. Cl.4 ...................... A01D 57/02; A01D 78/16
[52] U.S. Cl. ......................................... 56/220; 56/400
[58] Field of Search ............ 56/219, 220, 400, 400.21, 56/167, 168, DIG. 20

[56] References Cited

U.S. PATENT DOCUMENTS

| | | | |
|---|---|---|---|
| 2,570,852 | 10/1951 | Pfistershammer | 56/400.21 X |
| 3,613,346 | 10/1971 | Hubbard | 56/400 |
| 3,616,631 | 11/1971 | Quam | 56/400 |
| 3,796,030 | 3/1974 | Neal et al. | 56/220 |
| 4,520,620 | 6/1985 | Gessel et al. | 56/400 |
| 4,706,448 | 11/1987 | Gessel et al. | 56/400 |
| 4,776,155 | 10/1988 | Fox et al. | 56/220 |

Primary Examiner—Stephen J. Novosad
Attorney, Agent, or Firm—Lilling & Greenspan

[57] ABSTRACT

The distinguishing feature of the invention resides in the fact that each tine of the rake bar is configured in the cross-section as an isosceles triangle with a working edge defined by a vertex of an angle between the lateral sides in the direction of rotation of the reel, and in the zone of the vertex, the working edge of the tine is defined by the base of the isosceles triangle. A portion of each tine between its vertex a fastener member for attaching the tine to the bat blade is curvilinear and has a longitudinal slot.

4 Claims, 4 Drawing Sheets

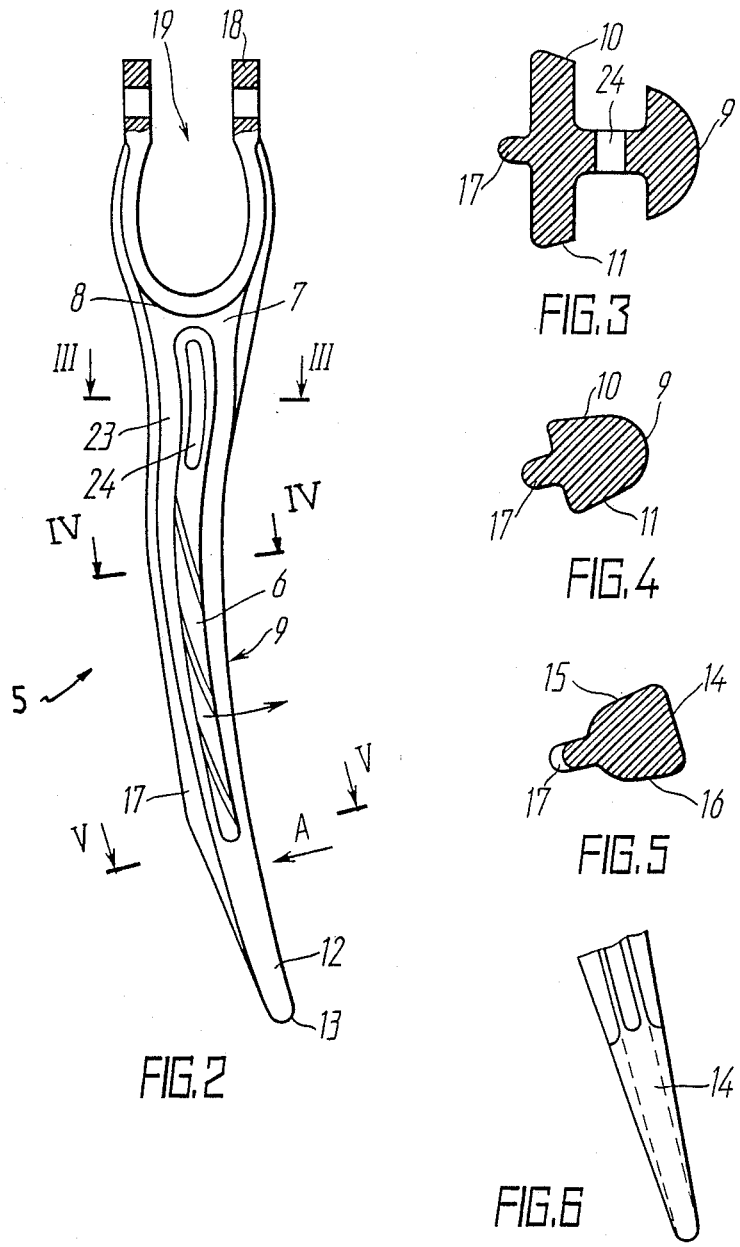

HARVESTER REEL RAKE BAR

BACKGROUND OF THE INVENTION

1. Field of the Invention

The invention relates to agricultural engineering, and in particular, it deals with the construction of harvester reels and is aimed at improving a reel rake bar, and more specifically, its time and bat blade.

2. Description of the Prior Art

Known reels are provided with wooden or metal blades which are attached by means of arms to a central shaft of the reel. They have serious disadvantages such as:

low efficiency of production process;

low productivity and unstable character of action exerted by the bat blade during operation in processing wet lodged and infested stalk mass thus resulting in considerable losses of the plant being harvested.

This is explained by the fact that the bat blade cannot lift the lodged stalk mass, hold it after cutting by the cutter device and reliably supply the stalk mass to a conveying member of the reel. The disadvantages can be partly eliminated by providing the known bat blades with tines.

Known in the art are reels in which a bat blade is made in the form of a rake bar which comprises an elongated pipe extending lengthwise of the reel and having tines, each tine being in the form of a straight rod made of a spring wire and extending through pipe perforations and a retainer loop.

The reel provided with a such rake bar can fairly work with drooping and lodged stalk mass so that a certain reduction of grain loss behind the harvester can be achieved.

However, along with the advantages, it has been found that this prior art reel has serious disadvantages because, the tine rod being straight, it cannot hold the stalk mass efficiently enough after cutting, and the stalks move and slip away from the tine thus resulting in a loss with cut stalks.

The tine of the rake bar of this type is also deficient in that, in operation in the fields with inadequate stalk plant cultivation, the tine can be so deformed as not to return to its original geometry, i.e. a residual deformation can occur which also results in an impaired quality of the process and in lower reliability in operation.

This rake bar is also deficient in a high labour effort for its manufacture as perforation should be made in the pipe for mounting the tines.

Known in the art is a construction of a more versatile rake bar which is free from the above disadvantages and which comprises a tubular shaft with bat blades and tines attached thereto and made of a spring steel of round section, the tines being arcuated with the concavity in the direction of rotation of the reel, a shock absorber in the form of one or two spiral flights, and a fastener member in the form of a loop surrounding the tubular shaft and the bat blade and secured by the spiral flight.

The rake bar having the spring tines with a shock absorber and with the rod which is arcuated can engage and lift lodged stalk mass in a very efficient manner hold it after cutting and feed to the reel conveyor.

The tine of this rake bar has a sufficient reliability in operation as the shock absorber in the form of a spiral flight allows the tine to deflect at a large enough angle when coming across an obstacle and to return to the initial position after passing by the obstacle without any change in shape owing to the elasticity of the spiral flight.

Owing to this construction of the tine, breakage of the tine becomes very unlikely.

However, the provision of the spiral flight in the construction of the tine, apart from positive properties of the tine, namely restoration of its shape, brings about an undesirable phenomenon, and namely, an impact action upon the stalk mass at the moment the tine emerges from the lodged mass or returns to the initial position after passage by an obstacle because of a high rate of the elastic rebound which causes grain losses through thrashing out.

In addition, the spiral flight causes pinching of the stalks thus bringing about stalk mass winding on the reel rake bar and disrupting the process carried out by the rake bar. In order to eliminate this disadvantage, transverse cuts are made on the bat blade, adjacent to the lower edge thereof, to partly receive the spiral flight thus slightly lowering the probability of pinching of the stalks between the flights. However, the cuts in the bat blade lower its strength and reliability in operation. The rake bars of this type are also deficient in that they require high labour effort for manufacture, installation and removal of the tines and have a high cost of manufacture.

All the abovedescribed constructions of the reel rake bars with steel tines have a common disadvantage residing in that tines getting into the cutter device cause its breakage.

Also known in the art is a reel rake bar having tines made of a structural plastic such as nylon.

A tine of such a rake bar comprises a thin rod arcuated with its concavity facing in the direction of rotation of the reel and having a varying I-beam cross-section lengthwise and a fastener member for attaching it to a bat blade, which comprises a V-shaped cut terminating in its lower portion in a rectangular mounting channel, the fastener having legs of different height, one, longer or rear leg having an end button (U.S. Pat. No. 3,796,030).

The bat blade of this rake bar is a wedge-shaped cross-section defining a relatively thin edge in the lower part thereof which is equidistant with respect to the mounting channel of the fastener member of the tine.

A rear wall of the bat blade has a circular hole.

To install the tine, it is applied to the lower part of the bat blade so that the button is received in the hole of the rear wall of the bat blade and the lower edge of the bat blade is received in the mounting channel of the tine.

This construction of the rake bar does not rule out different methods of the tine fastening to the bat blade, e.g. by means of bolts.

The rake bar having polymeric tines makes it possible to achieve a substantial reduction of metal weight of the construction and to lower labour effort in the manufacture, assembly and dismanting of the tines.

If the polymeric tine gets into the cutter device, the tine is easily cut without causing any damage to the cutter device.

However, the rake bar with polymeric tines is deficient in that a large concentration of mass in the zone of transition from the tine rod to its fastener member cannot enable elastic deformation of the tine with a large enough amplitude when coming across an obstacle without compromising its integrity.

Another disadvantage of such a tine of a rake bar resides in that when its vertex engages with a heavy lodged stalk mass, the tine is twisted in the vertical plane thus lowering its reliability in operation and disrupting the process with a loss of harvest. As the working surface of the prior art tine is formed by the flange of the I-beam section, rather than by the web, the losses through cut stalks increase.

An increased friction occurs on this surface in the zone of engagement between the stalk mass and the tine to hamper the movement of the cut stalk mass to the reel conveyor so that a part of the cut stalks is entrained by the tines and thrown over the reel forwardly and over the rear wall of the harvester.

Reliability of the attachment of the tines to the bat blade in the prior art rake bar is low. This is especially remarkable in harvesting under severe conditions (lodged plants, wet stalk mass, etc.). When the tine engages such a stalk mass, forces exerted by the stalk mass tend to deform the tine in the direction opposite to the direction of rotation of the reel. These forces are taken-up by the fastener member. As a result, the tine is broken adjacent to the fastener member, and deformation of the shorter front-end leg which is not fastened to the blade takes place. Under such conditions, all forces acting upon the tine rod are taken-up by the longer rear leg, and the button engages from the blade hole so that the tine is lost.

Therefore, the above described constructions of the reel rake bars are deficient in that they cannot effectively act upon the stalk mass thus bringing about unwarranted grain losses, lower productivity of the harvester and low reliability in operation, the metal weight of the structure being increased.

SUMMARY OF THE INVENTION

It is the main object of the invention to provide a harvester reel rake bar having enhanced elasticity and deformation properties of a tine.

It is also an object of the invention to intensify harvesting.

Another object of the invention is to lower metal weight of a harvester reel rake bar.

Further object of the invention is to improve reliability of tine fastening to a bat blade.

It is also an object of the invention to lower labour effect for installation and removal of the tine.

And finally, still another object of the invention is to improve productivity of the harvester.

These and other objects are accomplished by a harvester reel rake bar, comprising a bat blade carrying arcuated tines in the form of rods with the concavity in the direction of rotation of the reel and a fastener member for fastening them to the bat blade. According to the invention, each tine has a cross-sectional configuration in the form of an isosceles triangle with a working edge defined by the vertex of an angle between the lateral sides in the direction of rotation of the reel, a portion of the tine between its vertex and the fastener member being and having a longitudinal slot, and the working edge in the vertex zone being defined by the base of the isosceles triangle.

The curvilinear portion of the tine on the side opposite to its working edge is preferably provided with a longitudinal rib.

One embodiment involves a fastener member for the tine made with an oval cut receiving a liner, an outer surface of liner being defined by an arc of a radius equal to the smaller radius of the oval cut and an inner surface being in the form of a slot with a surface equidistant with respect to the lower part of the bat blade, the fastener member surrounding the bat blade so that a space is defined between the bat blade and the larger arcs of the oval cut.

Another embodiment involves the provision of a tine fastener member in the form of elastic legs having hooks engageable with mating recesses in the side surfaces of the bat blade, the base being equidistant with respect to the lower part of the bat blade.

This structural embodiment of the rake bar tines makes it possible to enhance reliability of the harvester in operation, intensify the harvesting process and improve quality of harvester operation.

The invention essentially consists in the following:

The tines mounted on a bat blade have a cross-sectional configuration in the form of an isosceles triangle with a working edge defined by the vertex of an angle between the lateral sides in the direction of rotation of the reel so as to lower friction in the zone of engagement of the stalk mass with the tines thereby enhancing slippage of the stalks and self-cleaning action of the tines after stalks feeding to a harvester conveyor so as to stabilize the process carried out by the reel and to reduce losses of harvest behind the harvester.

During operation, when the tines come into engagement with a heavy lodged stalk mass and also when coming across and obstacle in the form of stones, lumps of soil and the like, the tines would bend and deflect rearwards in a direction opposite to the direction of rotation of the reel. Deformation of the tines becomes so large that a breakage may occur.

The presence of smoothly running curvilinear portions and the provision of a longitudinal slot therein contribute to enhancement of elasticity characteristics ensuring deformation of the tine with a larger amplitude without compromising its integrity.

Apart from forces causing bending of the tine, forces are applied on the part of the stalk mass to the lateral sides which, taking into account a curvature of the tine, tend to twist it about the vertical axis. Owing to the fact that the working edge in the zone of the vertex is defined by the base of the isosceles triangle, the forces acting upon the lateral sides of the tine at different portions are differently directed and are mutually balanced thereby lowering torsional deformation. This facility ensures a balanced construction of the tine and its geometrical stability.

In addition to the forces acting on the part of the stalk mass upon the lateral sides, there are also forces acting upon the working surface of the tine vertex which tend to change its curvature. These forces are taken up by the longitudinal rib provided at the curvilinear portion of the tine on the side opposite to the working edge thereof so as to retain its curvature unchanged. Owing to the stable geometrical configuration of the tine, losses of grain with cut spikes owing to elimination of twisting of the tine and throwing of grain over the reel and rear wall of the harvester is minimized.

The provision of an oval cut in the tine fastener member, embracing the bat blade with the formation of space between the larger arcs of the oval cut and the side surfaces of the bat blade and the provision of a liner in the fastener member base having an outer surface defined by an arc of a radius equal to the smaller radius of the oval cut and an inner surface in the form of a slot with a surface equidistant with respect to the lower part of the bat blade, ensures a pivotal attachment of the tine so as to enable a larger amplitude of deformation of the tine and its return to the initial position without compromising its integrity and improve reliability of the harvester reel rake bar in operation.

Another embodiment of the fastener member of the tine in the form of elastic legs having hooks engageable with mating recesses provided in the side surfaces of the bat blade and a base with a surface equidistant with respect to the lower part of the blade makes it possible to lower labour effort for installation and removal of the tine, enhances reliability in operation and improves reliability of the harvester reel rake bar.

The reel rake bar having polymeric tines according to the invention was field-tested and showed the following advantages as compared with the prior art devices discussed above:

total loss behind the harvester was 0.22% lower and behind the reel 26.8% lower;

metal weight of the reel rake bar as 1.9–2.2 times lower whereby the reel mass was 20–30 kg lower depending on working width.

BRIEF DESCRIPTION OF THE DRAWINGS

These and other objects of the invention will become apparent from the following detailed description of specific embodiments of a reel rake bar illustrated in the accompanying drawings, in which:

FIG. 3 is a sectional view taken along line III—III in FIG. 2;

FIG. 4 is a sectional view taken along line IV—IV in FIG. 2;

FIG. 5 is a sectional view taken along line V—V in FIG. 2;

FIG. 6 is a side view taken along arrow A in FIG. 2;

DESCRIPTION OF THE PREFERRED EMBODIMENTS

Figure 1:
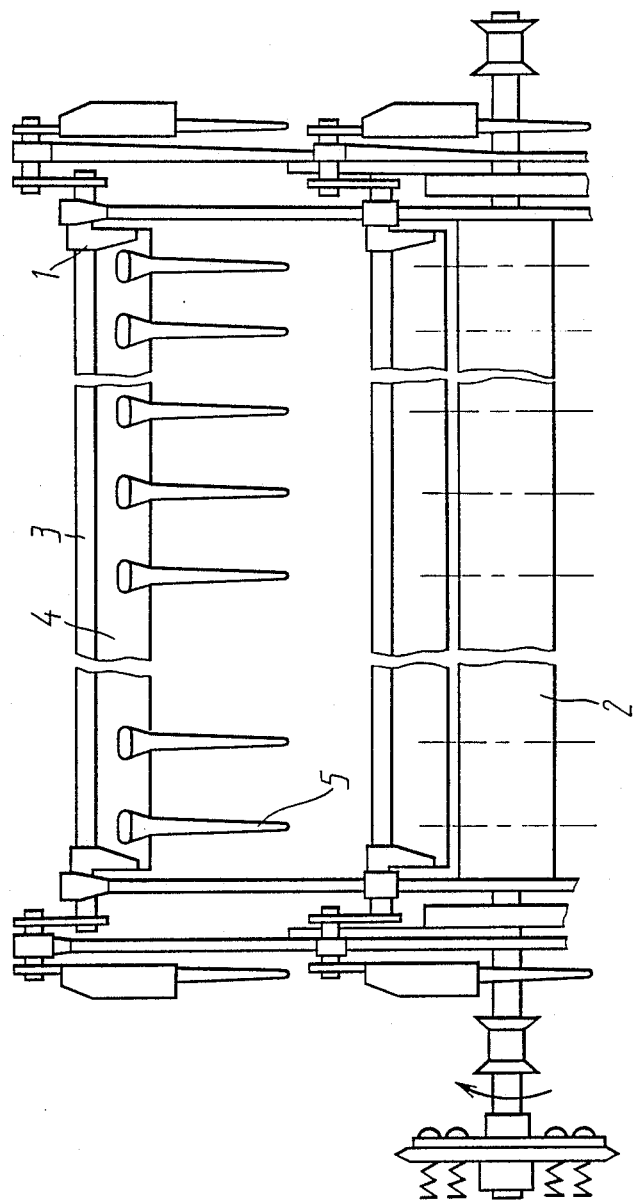
FIG. 1 is a general view of a harvester reel rake bar according to the invention, a rear elevation view.

A rake bar 1 (FIG. 1) of a reel 2 of a harvester (not shown) consists of a tubular shaft 3 and a bat blade 4 carrying tines 5.

The tine 5 (FIG. 2) comprises a rod 6 made of a polymeric material and curved along an arc with a concavity facing in the direction of rotation of the reel 2.

The rod 6 has a portion 7 in the zone adjacent to a base 8 which has a cross-sectional configuration in the form of an isosceles triangle with a working surface in the form of an edge 9 defined by a vertex of an angle between lateral sides 10 and 11 (FIGS. 3, 4) in the direction of rotation of the reel.

The rod 6 has also a portion 12 in the zone adjacent to a vertex 13 of the tine 5 which has a cross-sectional configuration of an isosceles triangle with a working surface (edge) defined by its base 14 and lateral sides 15, 16 (FIGS. 5, 6). A side opposite to the working edge 9 of the tine 5 has a longitudinal rib 17 (FIG. 2) conjugated with the vertex 13 and smoothly terminating in a hemisphere.

Figure 7:
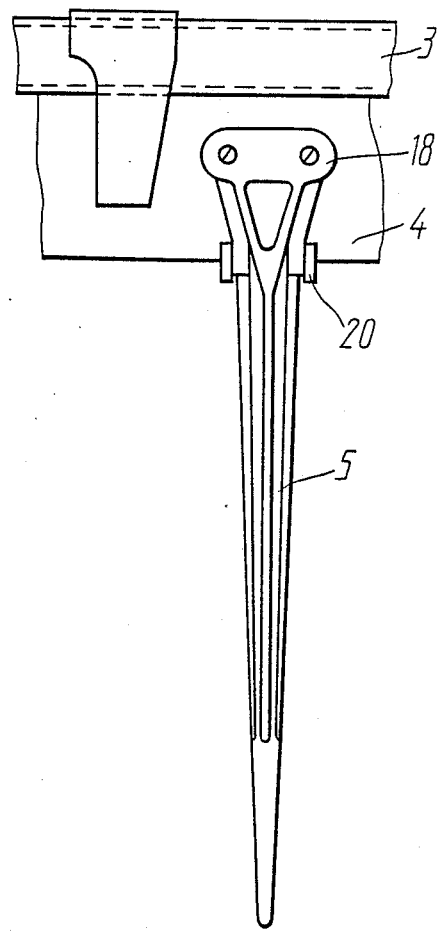
FIG. 7 shows the tine fastening to a bat blade of a rake bar, a front elevation view.

A fastener member 18 (FIG. 2) is made with an oval cut 19 receiving a liner 20 (FIGS. 7, 8) surrounding the bat blade 4 and defining a space between the bat blade and the larger arcs of the oval cut 19.

An outer surface 21 of the liner 20 is defined by an arc of a radius equal to the smaller radius of the oval cut 19, and an inner surface 22 is in the form of a slot with a surface equidistant with respect to the lower part of the bat blade 4.

A portion 23 (FIG. 2) of the tine 5 between its vertex 13 and the fastener member 18 is curvilinear and has a longitudinal slot 24. The curvilinear part of the portion 23 adjacent to the fastener member 18 is made with its convexity in a direction opposite to the direction of rotation of the reel 2, and the part adjacent to the vertex 13 of the tine 5 is made the other way round.

Figure 9:
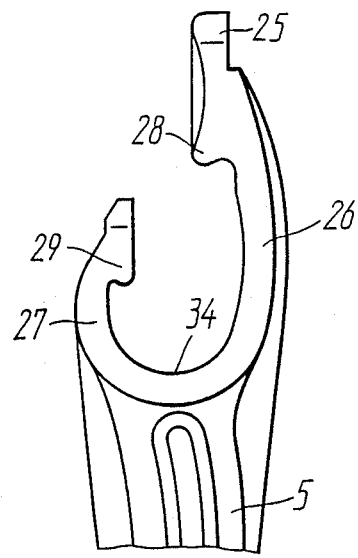
FIG. 9 is a side elevation view of a fastener member of the tine.
Figure 10:
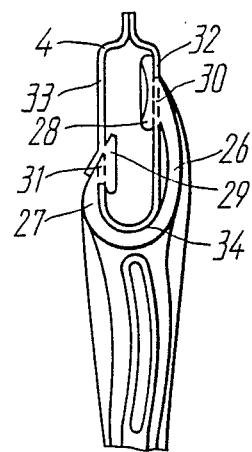
FIG. 10 is a side elevation view showing attachment of the tine to a rake bar bat blade.

In the embodiment (FIG. 9), a fastener member 25 of the tine 5 is made in the form of elastic legs 26 and 27 having hooks 28 and 29 engageable with mating recesses 30, 31 (FIG. 10) provided in side surfaces 32, 33 of the bat blade 4, and a base 34 of the fastener member is equidistant with respect to the lower part of the bat blade 4.

Figure 11:
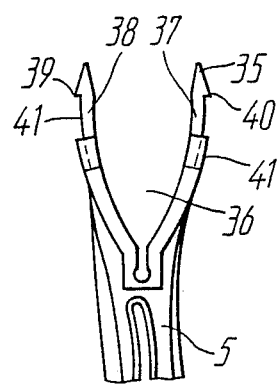
FIG. 11 is a side elevation view of a tine fastener member.
Figure 12:
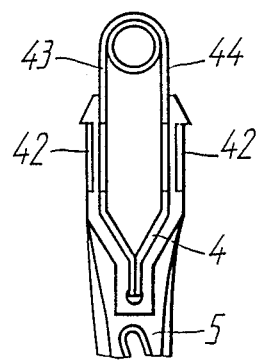
FIG. 12 is a side elevation view showing attachment of the tine to a bat blade.

In another embodiment (FIG. 11), a fastener member 35 of the tine 5 is made in the form of a V-shaped cut 36 having elastic legs 37 and 38 with hooks 39, 40 and transverse slots recesses 41 engageable with mating slots 42 (FIG. 12) provided in side surfaces 43, 44 of the bat blade 4 by drawing, and the base of the fastener member is equidistant with respect to the lower part of the bat blade.

The tine is installed on the bat blade in the following manner.

The tine 5 (FIG. 8) is brought from the bottom to the bat blade with the oval cut 19 in which the liner 20 is received so that the liner embraces the side surfaces of the bat blade, the inner surface 22 of the liner slot intimately embracing the lower part of the bat blade.

The tines are attached to the bat blade by means of bolts inserted into the aligned holes of the fastener member of the tine and the bat blade and nuts run on the bolts.

The tines are removed in the reversed order.

In other embodiments, the tine is mounted on the bat blade as follows.

The tine 5 (FIG. 10) is inserted with its elastic leg 26 having the hook 28 into the recess 30 in the side surface 32 of the bat blade 4 and is turned clockwise until the leg 27 and the hook 29 are aligned with the recess 31. Upon further rotation of the tine 5, the hook 29 snaps in the recess 31 to intimately embrace the lower part of the bat blade.

The tine is removed by forcing the hook 29 out of the recess 31 by means of a screwdriver, turning the tine counterclockwise and withdrawing the leg 26 from the recess 30.

This construction of the fastening means ensure reliability, lowers labour effort for installation and removal of the tines and reduces metal weight.

The tine 5 (FIGS. 11, 12) having the V-shaped cut 36 is placed below the bat blade so as to embrace the bat blade and the legs 37 and 38 extend opposite to the recesses. The legs 37 and 38 are then pressed together and inserted into the recesses 42 of the bat blade until the hooks 39, 40 are received therein behind the recess edges, the legs then elastically expanding to snap against the upper edge of the recess, and the pillars of the recesses are received in the transverse recesses 41 of the legs.

The hooks 39, 40 bear against the upper edge of the recess so as to ensure reliable retention of the tine on the bat blade.

The tine is removed by forcing the hooks 39, 40 out of the recesses 42 of the bat blade by means of a screwdriver.

The rake bar with the tines functions in the following manner.

During rotation of the reel 2, the rake bar 1 with the tines 5 comes in engagement with standing stalks, engages a strip of stalks and feeds them to a cutter device (not shown) and then feeds the cut stalks to a conveying member of a harvester (not shown).

Figure 8:
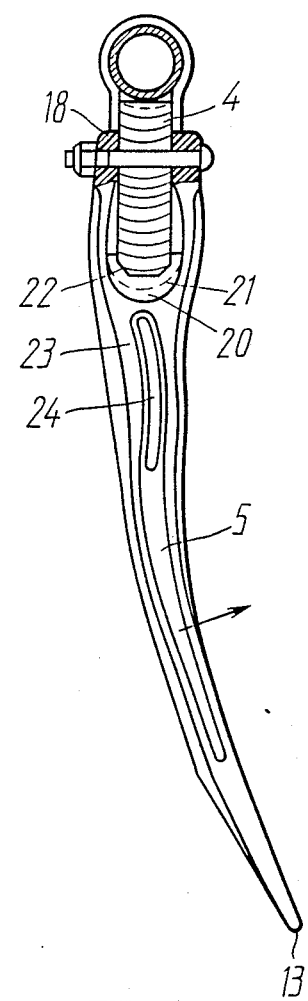
FIG. 8 is similar to FIG. 7, but showing a side elevation view.

Normally, upon coming across an obstacle (stones, lumps of soil, etc.), the tine 5 would bend backwardly in a direction opposite to the direction of rotation of the reel (as shown by arrow in FIG. 8).

Deformation of the tine may be so large that it might cause its breakage.

The tine 5 has a number of elements diminishing the danger of the tine breakage:

the curvilinear portion 23 aimed at enhancing elasticity properties of the tine;

a pivotal attachment of the tine 5 to the bat blade 4 ensuring deformation of the tine with a larger amplitude without compromising its integrity;

the portion 12 of the rod 6 in the zone adjacent to the vertex 13 of the tine 5 which is configured in the cross-sect on as an isosceles triangle with a working surface defined by the base 14 and lateral sides 15, 16, the side opposite to the working edge 9 being provided with the longitudinal rib 17 extending along the curvilinear portion of the tine and smooth-terminating in a hemisphere at the vertex 13 of the tine so as to reduce torsional deformation of the tine in the vertical plane and to change its curvature.

When coming across an obstacle, the first phase of deformation occurs before engagement of the opposite elongated sides of the longitudinal slot 24, whereafter the deformation can eventually carry on into a second phase during which the oval cut 19 slides along the outer surface 21 of the line 20 until the larger front-end arc of the oval cut 19 is stretched into a straight line and the rear arc is deformed into an arc of a smaller radius.

When the obstacle is passed by, owing to elasticity of the fastener member, the tine 5 returns to the initial position without compromising its integrity.

When the tine 5 comes into engagement with heavy lodged stalk mass, the latter acts upon its lateral sides 10, 11 and 15, 16 with forces which, by virtue of curvature of the tine, tend to twist it about its vertical axis. As the profile of the portion 12 is turned about the vertical axis at 180° with respect to the profile of the portion 7, forces acting upon the lateral sides 10 and 11 and lateral sides 15 and 16 of the portion 7 are differently directed to that they are mutually balanced thereby lowering torsional deformation of the tine. This ensures the balanced structure of the tine and its geometrical stability.

In addition to forces acting on the part of the stalk mass upon the lateral sides, there are also forces acting upon the base 14 and tending to change its curvature. These forces are taken up by the longitudinal rib 17. Owing to the geometrical stability of the tine, grain losses with cut spikes are reduced owing to elimination of the tine twisting and the losses through stalk engagement and throwing over the reel and rear wall of the harvester (not shown) are also reduced.

The provision of the working surface the tine 5 with the working edge 9 defined by the vertex of an angle of an isosceles triangle makes it possible to lower friction in the zone of engagement of the tine 5 with the stalk mass thereby enhancing slippage of the stalks and contributing to a reduction of losses with cut spikes.

The invention may be most advantageously used in harvesting long-stalk, lodged and wet vegetable mass such as cereals under unfavourable conditions wheat, rye, readily falling out plants such as millet, buckwheat, seed plants of grasses such as clover, lucerne and other plants.

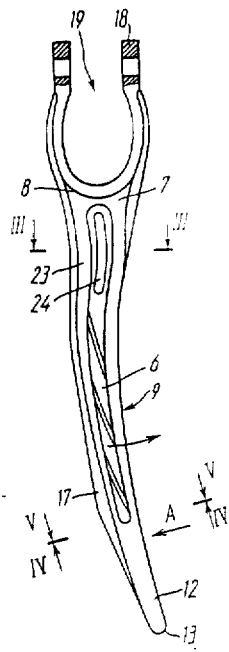

We claim:

1. A harvester reel bat blade, comprising:
   a bat blade;
   tines in the form of arcuated rods attached at one end to said bat blade and having a concavity in the direction of rotation of the reel;
   each of said tines having lateral sides inclined at an angle relative to each other and meeting at a first vertex facing the direction of rotation of the reel and having a cross-sectional configuration in the form of an isosceles triangle with one working edge being formed by said first vertex, and having a second vertex at the other end of each of said tines and having a second working edge in a zone of said second vertex, said second working edge being defined by the base of the isosceles triangle;
   a fastener member for attaching said tines to said bat blade; and
   a curvilinear portion with a longitudinal slot on the surface of each of said tines, said portion extending between the vertex of the tine and said fastener member.

2. A rake bar according to claim 1, wherein the curvilinear portion of the tine on the side opposite to its working edge is provided with a longitudinal rib.

3. A rake bar according to claim 1, wherein the fastener member of the tine is made with an oval cut receiving a liner, an outer surface of the liner being defined by an arc of a radius equal to the smaller radius of the oval cut and an inner surface being made in the form of a slot with a surface equidistant with respect to the lower part of the bat blade, the fastener member embracing the bat blade and defining a space between the bat blade and the larger arcs of the oval cut.

4. A rake bar according to claim 1, wherein the fastener member of the tine comprises elastic legs having hooks engageable with mating recesses provided in the side surfaces of the bat blade, and wherein the base of the fastener member is equidistant with respect to the lower part of the bat blade.

* * * * *

UNITED STATES PATENT AND TRADEMARK OFFICE
CERTIFICATE OF CORRECTION

PATENT NO. : 4,901,511

DATED : February 20, 1990

INVENTOR(S) : YARMASHEV, Jury N., et al.

It is certified that error appears in the above-identified patent and that said Letters Patent is hereby corrected as shown below:

The title page showing the illustrative figure should be deleted to be replaced with the attached title page.

Figure 2:
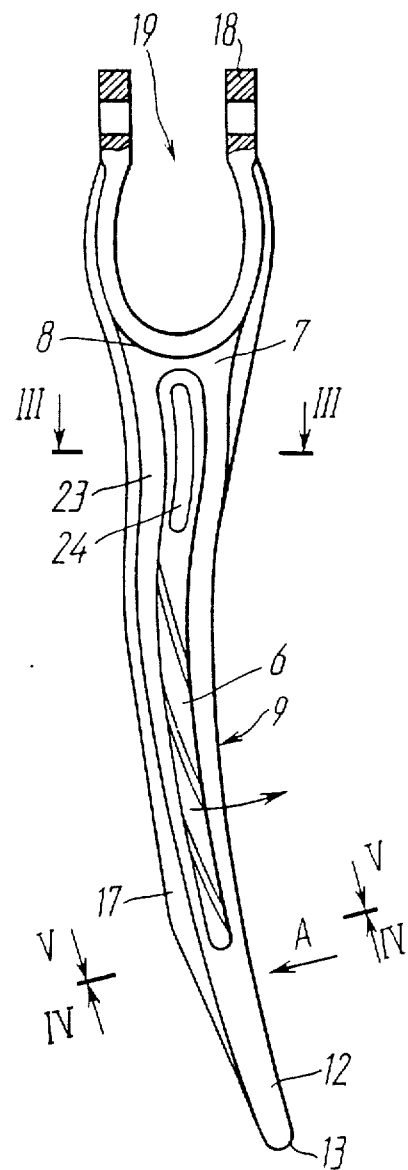
FIG. 2 is a general view of a rake bar tine, a side elevation view.

In the drawings, FIG. 2 should be deleted to be replaced with FIG. 2 as shown on the attached page.

Signed and Sealed this

Twenty-sixth Day of November, 1991

Attest:

HARRY F. MANBECK, JR.

*Attesting Officer*  *Commissioner of Patents and Trademarks*

United States Patent [19]
Yarmashev et al.

[11] Patent Number: 4,901,511
[45] Date of Patent: Feb. 20, 1990

[54] HARVESTER REEL RAKE BAR

[76] Inventors: Jury N. Yarmashev, Taganrog, I Krepostnoi Pereulok, 34, kv. 213, Rostovskaya oblast; Alexandr L. Nikolaenko, Taganrog, Bezymyanny proezd, 5/I, kv. 40, Rostovskaya oblast; Alexandr F. Kotenko, Taganrog, Bezymyanny proezd, 3, kv. 8, Rostovskaya oblast; Evgeny A. Chernenko, Taganrog, Bezymyanny proezd, 3, kv. 37, Rostovskaya oblast; Vsevolod V. Abramov, ulitsa Poklonnaya, 6, kv. 4; Alexandr V. Veselov, ulitsa Karla Marxa, 21/4, kv. 20, both of Moscow; Nikolai L. Rysin, Solntsevsky prospekt, 6, korpus I, kv. 27, Moscow; Vera N. Salnikova, ulitsa Studencheskaya, 16, kv. 88, Moscow, all of U.S.S.R.

[21] Appl. No.: 257,429
[22] Filed: Oct. 13, 1988
[51] Int. Cl.⁴ .................. A01D 57/02; A01D 78/16
[52] U.S. Cl. .............................. 56/220; 56/400
[58] Field of Search ............ 56/219, 220, 400, 400.21, 56/167, 168, DIG. 20

[56] References Cited
U.S. PATENT DOCUMENTS

| | | | |
|---|---|---|---|
| 2,570,852 | 10/1951 | Pfistershammer | 56/400.21 X |
| 3,613,346 | 10/1971 | Hubbard | 56/400 |
| 3,616,631 | 11/1971 | Quam | 56/400 |
| 3,796,030 | 3/1974 | Neal et al. | 56/220 |
| 4,520,620 | 6/1985 | Gessel et al. | 56/400 |
| 4,706,448 | 11/1987 | Gessel et al. | 56/400 |
| 4,776,155 | 10/1988 | Fox et al. | 56/220 |

*Primary Examiner*—Stephen J. Novosad
*Attorney, Agent, or Firm*—Lilling & Greenspan

[57] ABSTRACT

The distinguishing feature of the invention resides in the fact that each tine of the rake bar is configured in the cross-section as an isosceles triangle with a working edge defined by a vertex of an angle between the lateral sides in the direction of rotation of the reel, and in the zone of the vertex, the working edge of the tine is defined by the base of the isosceles triangle. A portion of each tine between its vertex a fastener member for attaching the tine to the bat blade is curvilinear and has a longitudinal slot.

4 Claims, 4 Drawing Sheets